US008111608B2

(12) United States Patent
Takahashi et al.

(10) Patent No.: US 8,111,608 B2
(45) Date of Patent: Feb. 7, 2012

(54) RADIO-COMMUNICATION DEVICE AND RADIO-COMMUNICATION METHOD

(75) Inventors: Hiroaki Takahashi, Kanagawa (JP); Ryo Sawai, Tokyo (JP); Tomoya Yamaura, Tokyo (JP); Takushi Kunihiro, Tokyo (JP); Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 371 days.

(21) Appl. No.: 11/914,391

(22) PCT Filed: Feb. 16, 2007

(86) PCT No.: PCT/JP2007/053338
§ 371 (c)(1),
(2), (4) Date: Nov. 14, 2007

(87) PCT Pub. No.: WO2007/094519
PCT Pub. Date: Aug. 23, 2007

(65) Prior Publication Data
US 2008/0212696 A1    Sep. 4, 2008

(30) Foreign Application Priority Data

Feb. 17, 2006  (JP) ................. 2006-040204

(51) Int. Cl.
*H04W 52/00*  (2009.01)
*H04W 80/00*  (2009.01)

(52) U.S. Cl. ........................ 370/208; 370/311

(58) Field of Classification Search .......... 370/206–208, 370/311
See application file for complete search history.

(56) References Cited

U.S. PATENT DOCUMENTS 4,884,075 A    11/1989   Mangelsdorf
(Continued)

FOREIGN PATENT DOCUMENTS

EP    1635558    3/2006
(Continued)

OTHER PUBLICATIONS

"HTPHY Specification", by Enhanced Wireless Consortium (EWC), Jan. 2, 2006, V1.28, pp. 1-74.*

(Continued)

*Primary Examiner* — Melvin Marcelo
(74) *Attorney, Agent, or Firm* — Oblon, Spivak, McClelland, Maier & Neustadt, L.L.P.

(57) ABSTRACT

A radio-communication device performs processing in a communication environment in which an OFDM (Orthogonal Frequency Division Multiplexing) modulation method is used. The radio-communication device includes a signal-reception unit that receives a MIMO (Multi Input Multi Output) signal, a data-decoding unit that decodes the MIMO signal, and a data-processing unit that processes data decoded by the data-decoding unit. The radio-communication device also includes a format-determination unit that determines, based on a relative phase difference between a previous packet field and a subsequent packet field adjacent to the previous packet field, a packet format of the MIMO signal. Further, the radio-communication device includes a control unit that stops an operation of the data-decoding unit when the data-processing unit does not support the packet format, which is determined by the format-determination unit. The operation is performed in a field that comes after a field at which the format-determination unit determines the packet format.

12 Claims, 15 Drawing Sheets

U.S. PATENT DOCUMENTS

| | | | |
|---|---|---|---|
| 5,936,546 A | | 8/1999 | Nasuda |
| 5,987,033 A | | 11/1999 | Boer et al. |
| 7,233,612 B1 | * | 6/2007 | Zhang et al. ................. 375/130 |
| 7,292,639 B1 | * | 11/2007 | Demirekler et al. .......... 375/260 |
| 2002/0160769 A1 | | 10/2002 | Gray |
| 2004/0114679 A1 | * | 6/2004 | Ryu et al. ...................... 375/222 |
| 2005/0174927 A1 | * | 8/2005 | Stephens et al. .............. 370/206 |
| 2005/0226204 A1 | | 10/2005 | Uehara |
| 2005/0231493 A1 | | 10/2005 | Takahashi |
| 2006/0002487 A1 | | 1/2006 | Kriedte |
| 2006/0056530 A1 | * | 3/2006 | Nakao ........................... 375/260 |
| 2007/0253499 A1 | * | 11/2007 | Waters et al. ................. 375/260 |

FOREIGN PATENT DOCUMENTS

| | | |
|---|---|---|
| JP | 10-13477 A | 1/1998 |
| JP | 2002 44051 | 2/2002 |
| JP | 2005-210690 A | 8/2005 |
| JP | 2005-292437 A | 10/2005 |
| WO | WO 03/094417 A1 | 11/2003 |
| WO | WO 2004/107746 A1 | 12/2004 |

OTHER PUBLICATIONS

Provisional U.S. Appl. 60/762,243, filed Jan. 26, 2006.*
Octavia A. Dobre, et al., "Blind Modulation Classification: A Concept Whose Time Has Come," Advances in Wired and Wireless Communication, 2005 IEEE/SARNOFF Symposium on Princeton, New Jersey, USA, Apr. 18-19, 2005, Piscataway, NJ, USA, IEEE, pp. 223-228.
Heejung Yu, et al., "Design of Dual-Band MIMO-OFDM System for Next Generation Wireless LAN," Communications, 2005 ICC 2005, 2005 IEEE International Conference on Seoul, Korea, May 16-20, 2005, Piscataway, NJ, USA, IEEE, May 16, 2005, pp. 2640-2644.
TGn Sync: "An IEEE 802.11n Protocol Standard Proposal Alliance, PHY Overview," Jun. 2004, the whole document.
Extended European Search Report issued Jul. 4, 2011, corresponding to European Patent Application No. 10194388.4.
European Examination Report issued on Jun. 24, 2011 in corresponding European Application No. 07 737 330.6.
Japanese Office Action issued on May 31, 2011 in corresponding Japanese Application No. 2006-040204.

* cited by examiner

FIG. 15

| Rate (4 bits) | | | | R | | | Length (12 bits) | | | | | | | | | | P | Tail (6 bits) | | | | | |
|---|---|---|---|---|---|---|---|---|---|---|---|---|---|---|---|---|---|---|---|---|---|---|---|
| R1 | R2 | R3 | R4 | | | | | | | | | | | | | | | "0" | "0" | "0" | "0" | "0" | "0" |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

RADIO-COMMUNICATION DEVICE AND RADIO-COMMUNICATION METHOD

TECHNICAL FIELD

The present invention relates to a radio-communication device and a radio-communication method performing communication operations in a communication environment generated on the basis of specifications specifying a plurality of packet formats and particularly relates to a radio-communication device and a radio-communication method that do not support at least some of the specified packet formats.

More specifically, the present invention relates to a radio-communication device and a radio-communication method performing reception operations in Mixed Mode that supports IEEE802.11n and that is compatible with IEEE802.11a/g, and particularly relates to a radio-communication device and a radio-communication method that perform effective communication operations upon receiving a Green-Field packet, even though the radio-communication device and the radio-communication method do not support Green Field.

BACKGROUND ART

Wireless networks have become a focus of attention, as systems free from wiring used for known wired-communication methods. IEEE (The Institute of Electrical and Electronics Engineers) 802.11 and/or IEEE802.15 can be named, as an ordinary standard relating to the wireless network.

For example, where IEEE802.11a/g is used, an OFDM (Orthogonal Frequency Division Multiplexing) modulation method which is one of multi-carrier systems is used, as an ordinary standard of wireless LANs. According to the OFDM-modulation method, transmission data is split across a plurality of carriers to which frequencies that are orthogonal to one another are set, and transferred. Therefore, the band of each of the carriers becomes narrow and the frequency-usage efficiency significantly increases, which achieves high endurance for a frequency-selective-phasing interference.

When IEEE802.11a/g standards are used, a modulation method achieving a communication speed of 54 Mbps at the maximum is supported. However, a next-generation wireless-LAN standard capable of achieving a higher bit rate has been demanded. For example, according to IEEE802.11n which is a standard generated by expanding IEEE802.11a/g, a MIMO (Multi-Input Multi-Output) communication is adopted, so as to develop a high-speed wireless-LAN technology achieving an effective throughput higher than 100 MPBS.

The MIMO communication is a technology achieving high-speed radio communications by using spatially multiplexed spatial streams. On the transmission-device side, transmission data is distributed to a plurality of streams and transmitted by using a plurality of antennas, and a reception device performs spatial separation for a spatially-multiplexed signal received through the plurality of antennas by performing signal processing using the channel characteristic, so that a signal can be extracted for every stream without causing any crosstalk (refer to Patent Document 1, for example). According to the MIMO-communication method, the transfer capacity is increased according the number of antennas without increasing the frequency band, whereby an increased communication speed can be achieved.

Further, a PHY layer of IEEE802.11n is provided with a high-throughput (High Throughput: HT) transfer mode (hereinafter referred to as "HT mode") wherein a transfer method (Modulation and Coding Scheme: MCS) including a modulation method and/or an encoding method is entirely different from that of known IEEE802.11a/g, and the PHY layer is provided with an operation mode wherein data transmission is performed in the same packet format and frequency area as those of known IEEE802.11a/g (hereinafter referred to as "legacy mode"). Further, the HT mode is divided into operation mode that is compatible with a known terminal supporting IEEE802.11a/g (hereinafter referred to as a "legacy terminal") and that is referred to as "Mixed Mode (MM)", and operation mode that is not compatible with the legacy terminal at all and that is referred to as "Green Field (GF)" (refer to Non-Patent Document 1, for example).

FIGS. 12 to 14 show packet formats used in the operation modes including the legacy mode, the MM, and the GF, respectively. However, in each of the drawings, a single OFDM symbol is determined to be 4 microseconds.

The format of a packet used in the legacy mode shown in FIG. 12 (hereinafter referred to as a "legacy packet") is entirely the same as that of IEEE802.11a/g. The header portion of the legacy packet has an L-STF (Legacy Short Training Field) including a known OFDM symbol provided, so as to find a packet, an L-LTF (Legacy Long Training Field) including a known training symbol provided, so as to perform synchronization acquisition and equalization, and an L-SIG (Legacy SIGNAL Field) wherein the transfer rate and/or the data length is written, as a legacy preamble. Subsequently, a payload (Data) is transmitted.

Further, the header portion of a packet shown in FIG. 13 (hereinafter referred to as an "MM packet") includes a legacy preamble generated in a format which is entirely the same as that used for IEEE802.11a/g, a subsequent preamble generated in a format which is typically used for IEEE802.11n (hereinafter referred to as an "HT format") (hereinafter referred to as an "HT preamble"), and a data portion. In the MM packet, the portion corresponding to a PHY payload provided in the legacy packet is generated in the HT format, and it may be considered that the HT preamble and the PHY payload are provided in the HT format, reflexively.

The HT preamble includes an HT-SIG, an HT-STF, and an HT-LTF. In the HT-SIG, information necessary to understand the HT format is written, the information showing an MCS and/or the payload-data length used for the PHY payload (PSDU). Further, the HT-STF includes a training symbol provided, so as to increase AGC (automatic-gain control) in a MIMO system. Further, the HT-LTF includes a training symbol provided, so as to perform channel estimation for every input signal subjected to spatial modulation (mapping) on the reception-device side.

Further, when the MIMO communication is performed by using at least two transfer branches, on the reception-device side, a channel matrix needs to be acquired by performing channel estimation for every transmission-and-reception antenna performing spatial separation for a reception signal. Therefore, on the transmission-device side, the HT-LTF is transmitted in a time-division manner from each of transmission antennas. Subsequently, at least one HT-LTF field is added according to the spatial-stream number.

The legacy preamble provided in the MM packet is generated in a format which is entirely the same as that of the preamble of the legacy packet and transferred in a transfer method so that the legacy terminal can decode the legacy preamble. On the other hand, the HT-format portion that comes after the HT preamble is transferred in a transfer method that is not supported by the legacy terminal. The legacy terminal decodes the L-SIG included in the legacy preamble of the MM packet and reads information showing that the MM packet is not addressed to itself, data-length information, and so forth, and sets an NAV (Network Allocation Vector) of an appropriate length, that is, a transmission-wait-time period, so as to avoid a collision. As a result, the MM packet can achieve compatibility with the legacy terminal. However, since the MM packet has the legacy-preamble portion, the format of the MM packet becomes redundant and the MM packet becomes disadvantageous in terms of a throughput.

Further, a packet shown in FIG. 14 (hereinafter referred to as a "GF packet") includes the HT-format portion only. The preamble of the GF packet includes an L-STF field provided, so as to find a packet, an HT-LTF field provided, so as to perform the channel estimation, an HT-SIG field wherein information necessary to interpret the HT format is written, and a 2nd HT-LTF field. When the MIMO communication is performed, a channel matrix needs to be acquired by performing the channel estimation for every spatial stream. Therefore, the HT-LTFs corresponding to the transmission-antenna number are transmitted in the time-division manner in the 2nd HT-LTF field (same as above). Although the GF packet is not compatible with the legacy terminal at all, the GF packet does not include the legacy preamble. Therefore, the GF packet can achieve a throughput higher than that of the MM packet.

Although support for the Mixed Mode (MM) is absolutely necessary for the currently used IEEE802.11n (EWC), support for the Green Field (GF) is optional. In such cases, it is assumed that two types of MM terminals including an MM terminal supporting the GF and an MM terminal that does not support the GF would be manufactured, as an MM terminal supporting the MM. Hereinafter, processing performed by the MM terminal that does not support the GF, so as to receive the above-described GF packet, will be considered.

First, since the first L-STF of the MM packet is the same as that of the GF packet, the MM terminal can receive the first L-STF without any problem. However, as for subsequent fields, the L-LTF is received, in the case where the MM packet is used. However, the HT-LTF is received in the case where the GF packet is used (refer to FIG. 13 and FIG. 14). The L-LTF is the same as an LTF symbol used for IEEE802.11a. LTF OFDM symbols used at the 20-MHz-operation time and the 40-MHz-operation time are shown by the following expressions (1) and (2), respectively.

[Expression 1]

$$L_{-26,26} = \{1, 1, -1, -1, 1, 1, -1, 1, -1, 1, 1, 1, 1, 1, 1, -1, -1,\\ 1, 1, -1, 1, -1, 1, 1, 1, 1, 0, 1, -1, -1, 1, 1, -1, 1, -1, 1,\\ -1, -1, -1, -1, -1, 1, 1, -1, -1, 1, -1, 1, -1, 1, 1, 1, 1\} \quad (1)$$

[Expression 2]

$$L_{-58,58} = \{1, 1, -1, -1, 1, 1, -1, 1, -1, 1, 1, 1, 1, 1, 1, -1, -1, 1, 1,\\ -1, 1, -1, 1, 1, 1, 1, 0, 1, -1, -1, 1, 1, -1, 1, -1, 1, -1, -1,\\ -1, -1, -1, 1, 1, -1, -1, 1, -1, 1, -1, 1, 1, 1, 1, 0, 0, 0, 0, 0,\\ 0, 0, 0, 0, 0, 0, 1, 1, -1, -1, 1, 1, -1, 1, -1, 1, 1, 1, 1, 1, 1, -1,\\ -1, 1, 1, -1, 1, -1, 1, 1, 1, 1, 0, 1, -1, -1, 1, 1, -1, 1, -1,\\ 1, -1, -1, -1, -1, -1, 1, 1, -1, -1, 1, -1, 1, -1, 1, 1, 1, 1\} \quad (2)$$

Further, HT-LTF sequences used at the 20-MHz-operation time and the 40-MHz-operation time are shown by the following expressions (3) and (4), respectively.

[Expression 3]

$$HTLTF_{-28,28} = \begin{bmatrix} 1, 1, 1, 1, -1, 1, 1, -1, 1, -1, 1, 1, 1, 1, 1, 1 \\ -1, 1, -1, 1, 1, 1, 1, 0, 1, -1, -1, 1, 1, -1, 1, \\ -1, 1, -1, -1, -1, -1, 1, 1, -1, -1, 1, -1, 1, \\ -1, 1, 1, 1, 1, -1, -1 \end{bmatrix} \quad (3)$$

[Expression 4]

$$HTLTF_{-58,58} = \quad (4)$$
$$\{1, 1, -1, -1, 1, 1, -1, 1, -1, 1, 1, 1, 1, 1, 1, 1 -1, -1, 1, 1, -1, 1,\\ -1, 1, 1, 1, 1, 1, 1, -1, -1, 1, 1, -1, 1, -1, 1, -1, -1, -1, -1,\\ -1, 1, 1, -1, -1, 1, -1, 1, -1, 1, 1, 1, 1, -1, -1, -1, 1, 0\ 0,\\ 0 - 1, 1, 1, -1, 1, 1, 1, -1, -1, 1, 1, -1, 1, -1, 1, 1, 1, 1, 1, 1,\\ -1, -1, 1, 1, -1, 1, 1, -1, 1, 1, 1, 1, 1, 1, -1, -1, 1, 1, -1, 1, -1,\\ 1, -1, -1, -1, -1, -1, 1, 1, -1, -1, 1, -1, 1, -1, 1, 1, 1, 1\}$$

If the MM terminal can recognize the difference between the L-LTF and the HT-LTF, the MM terminal can determine that the GF packet is received at that time. Then, the MM terminal does not perform unnecessary decoding processing in fields that comes after the determination so that the power consumed by reception processing is reduced. However, the L-LTF and/or the HT-LTF does not include mechanisms used for parity check, a CRC, and so forth, and the difference between the sequences is very little. Therefore, the difference between the L-LTF and the HT-LTF cannot be recognized by performing ordinary reception processing.

After that, when the MM packet is used, the L-SIG is received. However, when the GF packet is used, the HT-SIG is received (refer to FIGS. 13 and 14). FIG. 15 shows the format of an L-SIG field. As shown in the drawing, the L-SIG includes the mechanism used for the parity check (even parity for 0 to 16 bits is performed at the 17th bit in the decreasing order). However, since only a single bit is provided, the possibility of erroneously receiving the HT-SIG included in the GF packet, as the L-SIG, is not insignificant. Further, when the HT-SIG is confused with the L-SIG, 5 to 16 of the HT-SIG of the first symbol are read, as Length. Here, when the value read, as Length is longer than the real packet length, the retransmission time delays, which induces inefficient communications. Further, if the MM packet is confused with the GF packet, an unnecessary field is decoded, which wastes operation power of the device.

[Patent Document 1] Japanese Unexamined Patent Application Publication No. 2002-44051

[Non-Patent Document 1] EWC (Enhanced WIreless Consortium) PHY Specification

DISCLOSURE OF INVENTION

An object of the present invention is to provide a useful radio-communication device and a useful radio-communication method that can perform communication operations in a communication environment generated on the basis of specifications specifying a plurality of packet formats and that can perform effective communication operations upon receiving a packet format that is not supported by them.

Another object of the present invention is to provide a useful radio-communication device and a useful radio-communication method that can perform reception operations in Mixed Mode that supports IEEE802.11n and that is compatible with IEEE802.11a/g. However, upon receiving an unsupported Green-Field packet, the radio-communication device and the radio-communication method can increase the communication efficiency and reduce the power consumption without performing unnecessary decoding processing.

Accordingly, the present invention provides a radio-communication device performing packet-reception processing in a communication environment where packets generated in different formats traffic. The radio-communication device includes signal-reception means configured to receive a transfer signal transmitted from a packet-transmission source via an antenna, data-decoding means configured to decode a signal received by the signal-reception means, data-processing means configured to process data decoded by the data-decoding means, format-determination means configured to determine a packet format on the basis of the signal received by the signal-reception means, and control means configured to stop an operation of the data-decoding means when the data-processing means does not support the packet format determined by the format-determination means, the operation being performed in a field that comes after the determination is made.

The present invention relates to a radio-communication device configured to receive a MIMO signal in a communication system applying an OFDM-modulation method for MIMO communications. More specifically, the radio-communication device is a MIMO-reception device supporting IEEE802.11n and operates, as an MM terminal configured to receive both a legacy packet used for IEEE802.11a/g and a Mixed Mode (MM) packet including the HT format used for IEEE802.11n.

For IEEE802.11n, Green Field (GF) is being studied, as an HT mode achieving a high throughput. Since the GF packet includes the HT format alone, the GF packet can achieve a throughput higher than that of the MM packet including the legacy preamble.

The MM packet begins with the L-STF followed by the L-LTF and the L-SIG. On the other hand, the GF packet begins with the L-STF followed by the H-LTF and the HT-SIG. If the MM terminal that does not support the GF can discriminate between the L-LTF and the HT-LTF, the MM terminal can determine that the GF packet is received, at that time, so that unnecessary decode processing can be omitted in subsequent fields.

However, the L-LTF and/or the HT-LTF does not include mechanisms used for the parity check, the CRC, and so forth, and the difference between sequences is very little, so that the difference between the L-LTF and the HT-LTF cannot be recognized by performing ordinary reception processing. Therefore, an MM terminal that does not support the GF packet cannot make determination soon after the GF packet is received by performing ordinary reception operations, which may cause the possibility of performing inefficient communication operations, such as decoding an unnecessary field, causing a delay in the retransmission time by reading false information from the preamble, and so forth.

On the other hand, the radio-communication device relating to the present invention notes the difference between the formats of the MM packet and the GF packet, and performs a reception operation which allows for determining whether a reception packet is generated in the format of the MM packet or that of the GF packet with precision, so as to avoid unnecessary decoding operations performed at the GF-packet reception time. Accordingly, the power consumption is reduced and inefficient communications are avoided.

For example, as the difference between the format of the MM packet and that of the GF packet, the difference between the number of tones included in an OFDM symbol used in one of the packet formats and that of tones included in an OFDM symbol used in the other of the packet formats can be noted, so that it becomes possible to determine whether the reception packet is generated in a packet format used in Mixed Mode or that used in Green Field.

More specifically, each of fields including the L-LTF, the L-SIG, and the HT-SIG corresponding to the first to fifth OFDM symbols of the MM packet includes 52 tones. On the other hand, each of fields including the HT-LTF, the HT-SIG, and the 2nd HT-LTF corresponding to the first to fifth OFDM symbols of the GF packet includes 56 tones. Therefore, in the first to fifth OFDM symbols of the reception packet, it is verified whether or not a signal exists in an FFT output at ±27 and 28 shown in a subcarrier index, so that the format of the reception packet can be determined.

As a method of determining whether or not a signal is included at the positions corresponding to ±27 and 28 shown in the subcarrier index, an absolute determination method of comparing the power values of subcarriers of the OFDM symbol at its both ends to a predetermined threshold value, a relative-determination method of making determination by comparing power of the subcarrier with that of an adjacent subcarrier (that is, the carrier corresponding to a number equivalent to or smaller than ±26 shown in the subcarrier index), and so forth can be considered.

Further, the above-described determination can be made not only by considering the first OFDM symbol, but by calculating the average of results of measuring the power of subcarriers at both ends of the first to third OFDM symbols in the same manner. Subsequently, the above-described determination can be made with precision without being affected by noise problems. Otherwise, a small symbol-power difference is detected so that the format of a reception packet can be determined on the basis of the detection result.

Further, the legacy preamble and Cyclic Shift in the HT format of the MM packet differ from those of the GF packet. The above-described difference can be considered, as another difference between the format of the MM packet and that of the GF packet.

When the MIMO communications are performed, an intended beam is generated while signals that are the same as each other and/or similar to each other are transferred through different spatial streams. However, the transmission device sets a time difference between the transmission time corresponding to one spatial stream and that corresponding to the other spatial stream, and transmits data, whereby the above-described problem is solved. Adding a time-difference signal to a spatial stream is referred to as "Cyclic Shift" and/or "Cyclic Delay Diversity (CDD). An appropriate time difference set for the transmission time changes according to the number of spatial streams. Further, according to IEEE802.11n, a time difference set to the HT-format portion is larger than that set to the legacy-format portion even though the same number of spatial streams is used. Therefore, when the delay profile of the reception signal is calculated and the delay amount is large, it can be determined that the HT format is used.

Referring to the difference between the symbol-tone number of the L-LTF field and that of the HT-LTF field, and the difference between the time difference of the transmission time corresponding to one spatial stream and that corresponding to the other spatial stream, as described above, it becomes possible to determine the packet format by studying the part starting backward from the third symbol of the reception packet (the part starting backward from the L-SIG when the MM packet is used). In that case, if it is determined that the GF packet is used, decoding processing can be stopped in all of the fields from the L-SIG on down, which is highly effective at saving power.

Of course, the difference between the format of the MM packet and that of the GF packet can be used, the difference being caused in the field started forward from the L-SIG. For example, the difference between the symbol position where the HT-SIG appears in the preamble of the MM packet and that where the HT-SIG appears in the preamble of the GF packet can be used.

In the HT-SIG field, the BPSK modulation is performed in the phase space rotated by as much as 90 degrees with reference to the L-SIG field. Therefore, it becomes possible to determine which of the MM-packet format and the GF-packet format is used by verifying the position of an OFDM symbol subjected to the phase rotation and the BPSK modulation. For example, an absolute phase value of an OFDM symbol provided at the reception position corresponding to the HT-SIG field in the MM packet is measured, or a relative phase difference between the OFDM symbol and an adjacent symbol that is not subjected to the phase rotation is measured so that it becomes possible to determine whether or not the symbol is the HT-SIG.

Further, it becomes possible to determine whether or not the reception packet is generated in the MM-packet format according to whether or not parity check performed in the L-SIG field included in the legacy part of the MM packet is successful. Further, CRC check is performed by using data obtained by decoding the OFDM symbol corresponding to the HT-SIG field in the MM packet. The accuracy of the format determination can be increased by using results of the above-described processing in combination.

According to the present invention, a useful radio-communication device and a useful radio-communication method that can perform communication operations in a communication environment generated on the basis of specifications specifying a plurality of packet formats and that can perform effective communication operations upon receiving a packet format that is not supported by them can be provided.

Further, according to the present invention, a useful radio-communication device and a useful radio-communication method that can perform reception operations in Mixed Mode that supports IEEE802.11n and that is compatible with IEEE802.11a/g can be provided. However, upon receiving an unsupported Green-Field packet, the radio-communication device and the radio-communication method can increase the communication efficiency and reduce the power consumption without performing unnecessary decoding processing.

When the radio-communication device according to the present invention receives the Green-Field packet, even tough the radio-communication device does not support Green Field, the radio-communication device does not receive an unnecessary field over a long time period so that a waste of the device power can be avoided.

Further, the radio-communication device according to the present invention can avoid communication inefficiency caused by accidental reception of the HT-SIG of a Green-Field packet without packet fail and a delay in the retransmission time, the delay being caused by setting a meaninglessly long NAV.

Further, by using the present invention, the radio-communication device supporting Green Field can determine whether the reception packet is the MM packet or the GF packet.

Further objects, characteristics, and advantages of the present invention will be disclosed through a more detailed description provided on the basis of the following embodiments of the present invention and/or the attached drawings.

BRIEF DESCRIPTION OF THE DRAWINGS

FIG. 15 shows the data configuration of the L-SIG field.

Figure 1:
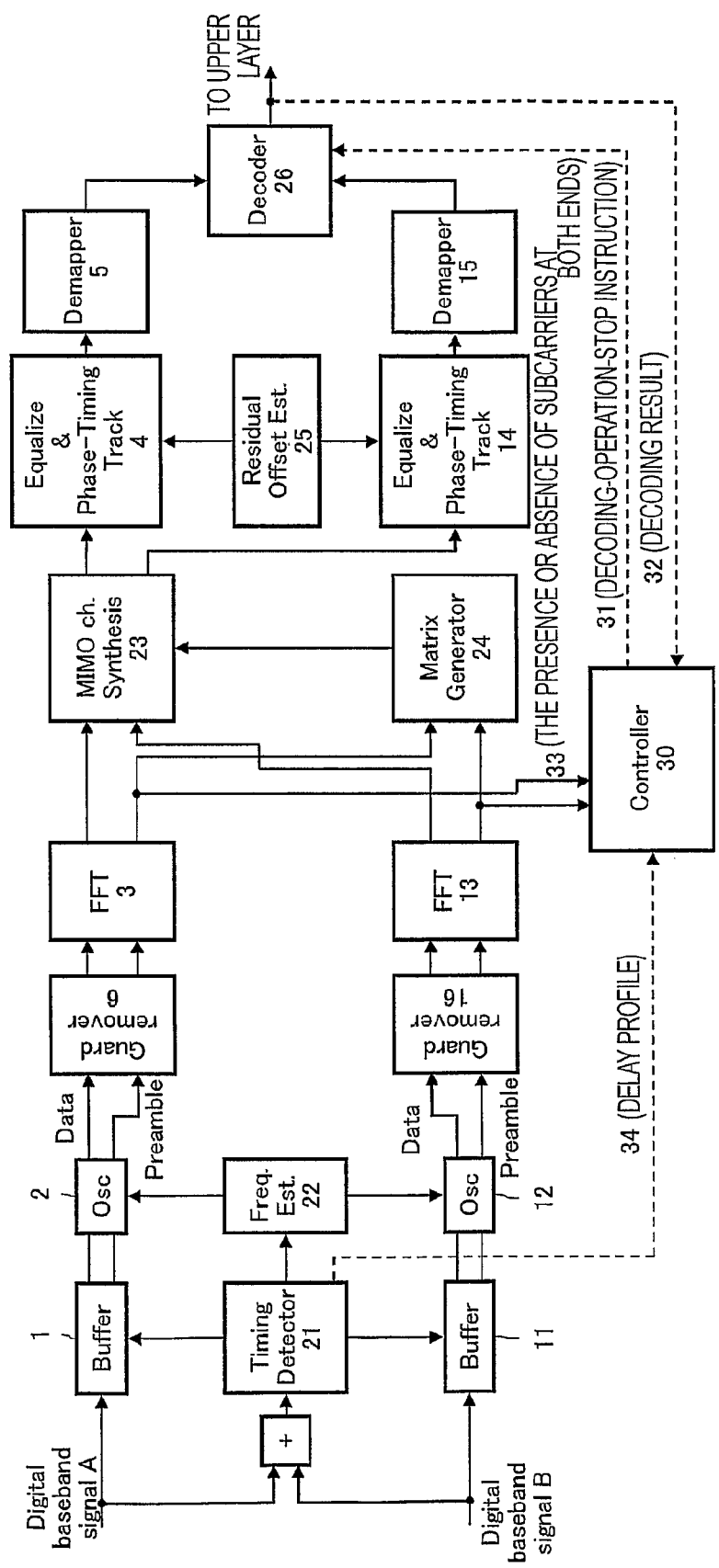
FIG. 1 shows the configuration of a digital-processing part of a MIMO-reception device according to an embodiment of the present invention.

REFERENCE NUMERALS 1, 11: buffer
2, 12: frequency-offset-correction unit
3, 13: fast Fourier transformer (FFT)
5, 15: modulation unit
6, 16: guard-removal unit
20: adder
21: timing-detection unit
22: frequency-error-estimation unit
23: MIMO-channel-synthesis unit
24: channel-matrix-generation unit
25: residual-frequency-offset-estimation unit
26: decoding unit
30: controller

BEST MODES FOR CARRYING OUT THE INVENTION

Hereinafter, embodiments of the present invention will be described in detail with reference to the attached drawings.

The present invention relates to a radio-communication device configured to receive a MIMO signal, the radio-communication device being used in a communication system performing MIMO communications for which the OFDM-modulation method is used. A MIMO-reception device supporting IEEE802.11n is provided, as an example of the above-described radio-communication device. For IEEE802.11n, an operation mode "Mixed Mode (MM)" compatible with IEEE802.11a/g is being studied, as an HT mode achieving a high throughput. Further, an operation mode "Green Field (GF)" which is not compatible with a legacy terminal at all is being studied, as the HT mode.

FIG. 1 shows the configuration of a digital-processing part of a MIMO-reception device according to an embodiment of the present invention. The shown reception device includes two reception antennas (not shown) and receives a MIMO signal including two spatial streams. In the following description, it is assumed that the above-described reception device does not support a GF packet shown in FIG. 14 even though the above-described reception device supports an MM packet shown in FIG. 13.

From an RF-processing unit which is not shown, two digital-baseband signals A and B are input, where the two digital-baseband signals A and B are obtained by performing RF processing for a reception signal of each of the reception antennas. On the shown digital-processing part's side, the above-described digital-baseband signals are MIMO-synthesized and separated into two independent spatial streams. Each of the streams is demodulated, and subjected to deinterleave, depuncturing, and channel decoding. After that, an original bit matrix is output.

When an L-STF is received and a packet is found, a timing-detection unit (Timing Detector) 21 calculates synchronization timing on the basis of autocorrelation of a reception signal in the L-STF, and cross-correlation between a reception signal in an L-LTF and a known training sequence of the reception device. The digital-baseband signal can be cut from each of buffers 1 and 11 for every OFDM symbol according to the synchronization timing.

At the same time, in frequency-offset-correction units (Osc) 2 and 12, frequency correction is performed for each of the digital-baseband signals A and B on the basis of a frequency-error-estimation value transmitted from a frequency-error-estimation unit (Frequency Estimator) 22.

After that, each of the digital-baseband signals A and B is separated into a preamble and a data portion. After a guard interval is removed from each of the digital-baseband signals A and B in guard-removal units (Guard removers) 6 and 16, the digital-baseband signals A and B are transmitted to fast Fourier transformers (FFT) 3 and 13, respectively. The FFTs 3 and 13 split the digital-baseband signals A and B in a time area into subcarriers in a frequency area.

A channel-matrix-generation unit (Matrix Generator) 24 generates a channel matrix H for every subcarrier on the basis of an FFT output of an HT-LTF that is transmitted from each of reception antennas (not shown) of a transmission device in a time-division manner. In a MIMO-channel-synthesis unit (MIMO Channel Synthesis) 23, an FFT output of the data unit of a packet is synthesized for each subcarrier by using the above-described channel matrix H. Then, the FFT output is separated into spatial streams.

More specifically, MIMO-channel synthesis is performed by calculating a reception-weight matrix W on the basis of the channel matrix H and multiplying a reception signal that had been subjected to the FFT by the reception-weight matrix X. Zero Force (nullifying principle), an MMSE (Minimum Mean Square Error), SVD (Singular Value Decomposition)-MIMO, and so forth can be provided, for example, as algorithms for calculating the reception-weight matrix W on the basis of the channel matrix H. However, the algorithms are not limited to the above-described examples.

MIMO-synthesized stream signals are transmitted to equalization-and-phase-tracking unit (Equalize & Phase-Timing Track) 4 and 14, respectively, and subjected to correction processing including residual-frequency offset and phase tracking. Then, in demodulation units (Demapper) 5 and 15, the stream signals are demodulated from modulation points to original values on phase space (constallation), and decoded to original data sequences by a decoding unit (Decoder) 26.

As described in [Background Art], for IEEE802.11n, Green Field other than Mixed Mode that guarantees compatibility with IEEE802.11a/g is studied, as the HT mode provided, so as to perform high-speed data transfer. Although Mixed Mode is absolutely necessary, Green Field is optional. Therefore, it is assumed that an MM terminal which only supports the former operation mode receives a GF packet.

Although the MM packet begins with an L-STF followed by an L-LTF and L-SIG, the GF packet begins with the L-STF followed by an H-LTF and an HT-SIG. If the MM terminal incapable of supporting the GF can discriminate between the L-LTF and the HT-LTF, the MM terminal can determine that the GF packet is received so that unnecessary decode processing is omitted in subsequent fields. However, the L-LTF and/or the HT-LTF does not include mechanisms provided, so as to perform parity check, CRC, and so forth, and there are little differences between the sequences. Therefore, it is difficult for the MM terminal to discriminate between the L-LTF and the HT-LTF by performing ordinary reception processing. If the MM terminal is incapable of recognizing the difference between the L-LTF and the HT-LTF, the MM terminal may recognize the HT-SIG, as the L-SIG, which results in inefficient communications caused by a NAV that is set over an inappropriate time period, for example.

Therefore, the radio-communication device according to the above-described embodiment can perform a reception operation which allows for determining the format of a reception packet with precision on the basis of the difference between the formats of the MM packet and the GF packet.

For example, the difference between the number of tones included in OFDM symbols of fields of the MM packet and that of tones included in OFDM symbols of fields of the GF packet can be noted, as the difference between the format of the MM packet and that of the GF packet. In IEEE802.11n EWC PHY Specification, the number of tones of an OFDM symbol included in each of fields of the legacy part and the HT part of a packet is specified, as shown in the following tables (refer to Non-Patent Document 1).

TABLE 1

| Field | $N_{Field}^{Tone}$ | |
|---|---|---|
| | 20 MHz | 40 MHz |
| L-STF | 12 | 24 |
| L-LTF | 52 | 104 |
| L-SIG | 52 | 104 |

TABLE 2

| Field | $N_{Field}^{Tone}$ | |
| --- | --- | --- |
| | 20 MHz | 40 MHz |
| HT-SIG | 52/56* | 104/114* |
| HT-STF | 12 | 24 |
| HT-LTF | 56 | 114 |
| HT-Data | 56 | 114 |
| HT-Data-40 MHz Dup. Format | — | 104 |

In Table 2, the number of tones included in the HT-SIG of the MM packet is 52 and/or 104, and that of the GF packet is 56 and/or 104.

Figure 2:
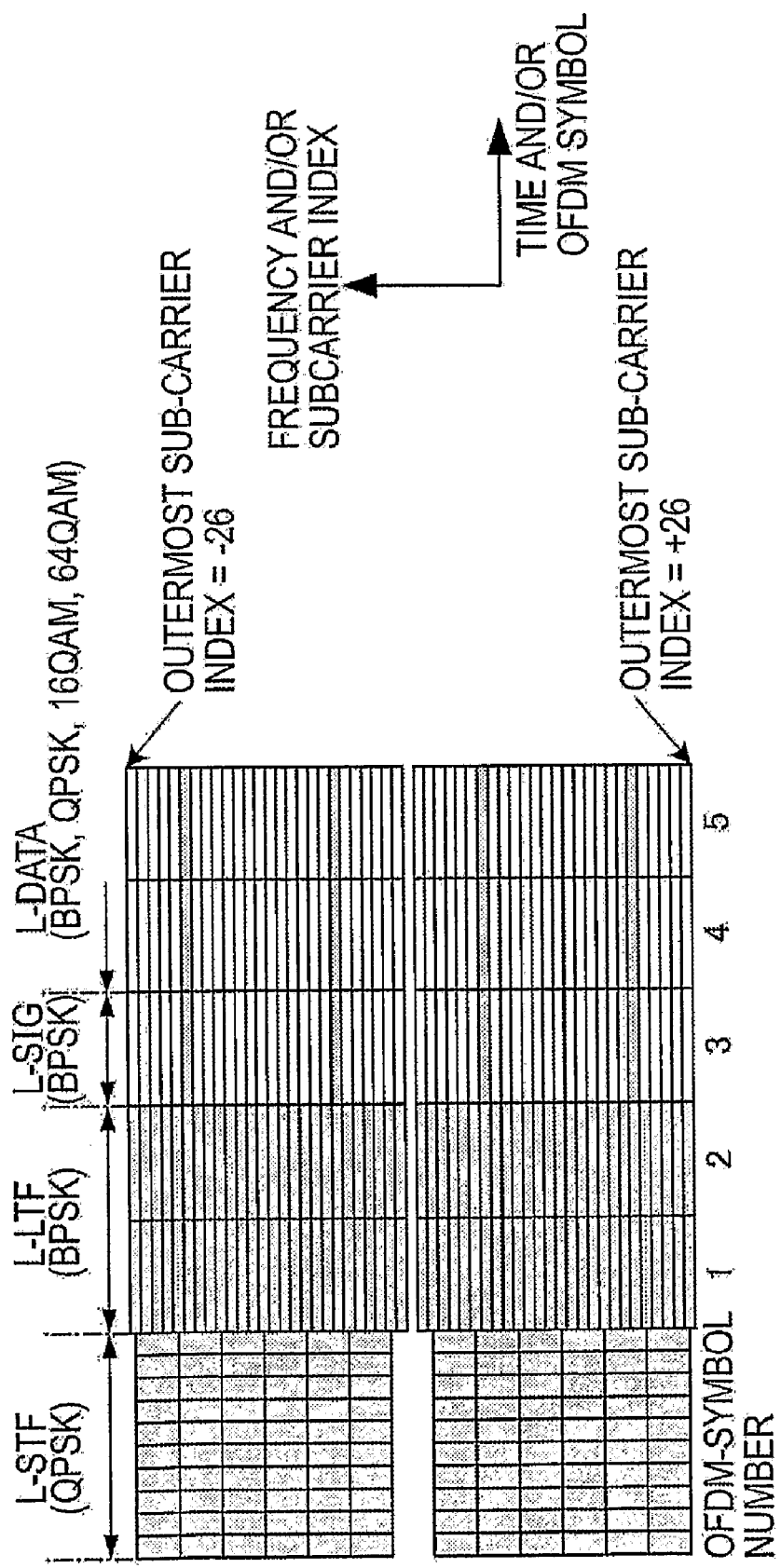
FIG. 2 shows the format of a legacy packet used in the case where IEEE802.11n is used.
Figure 3:
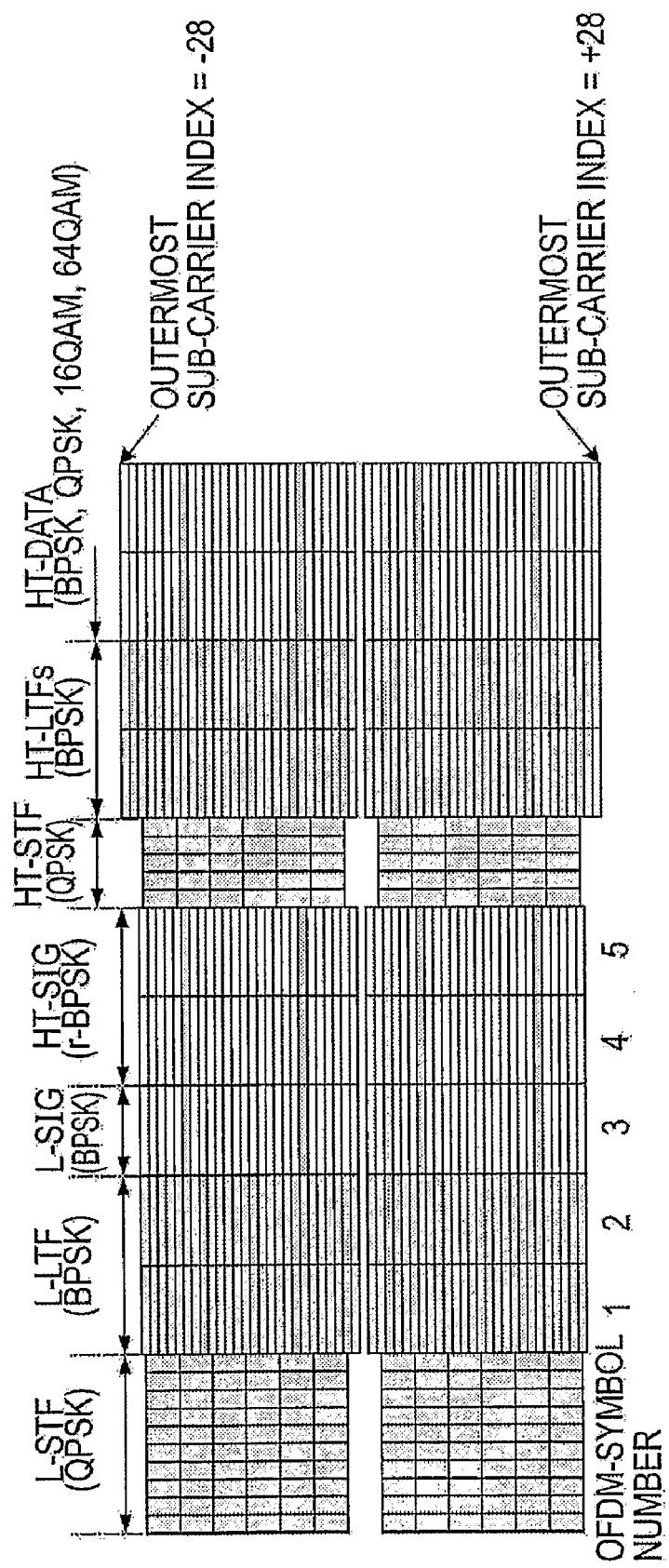
FIG. 3 shows the format of a Mixed-Mode packet used in the case where IEEE802.11n is used.
Figure 4:
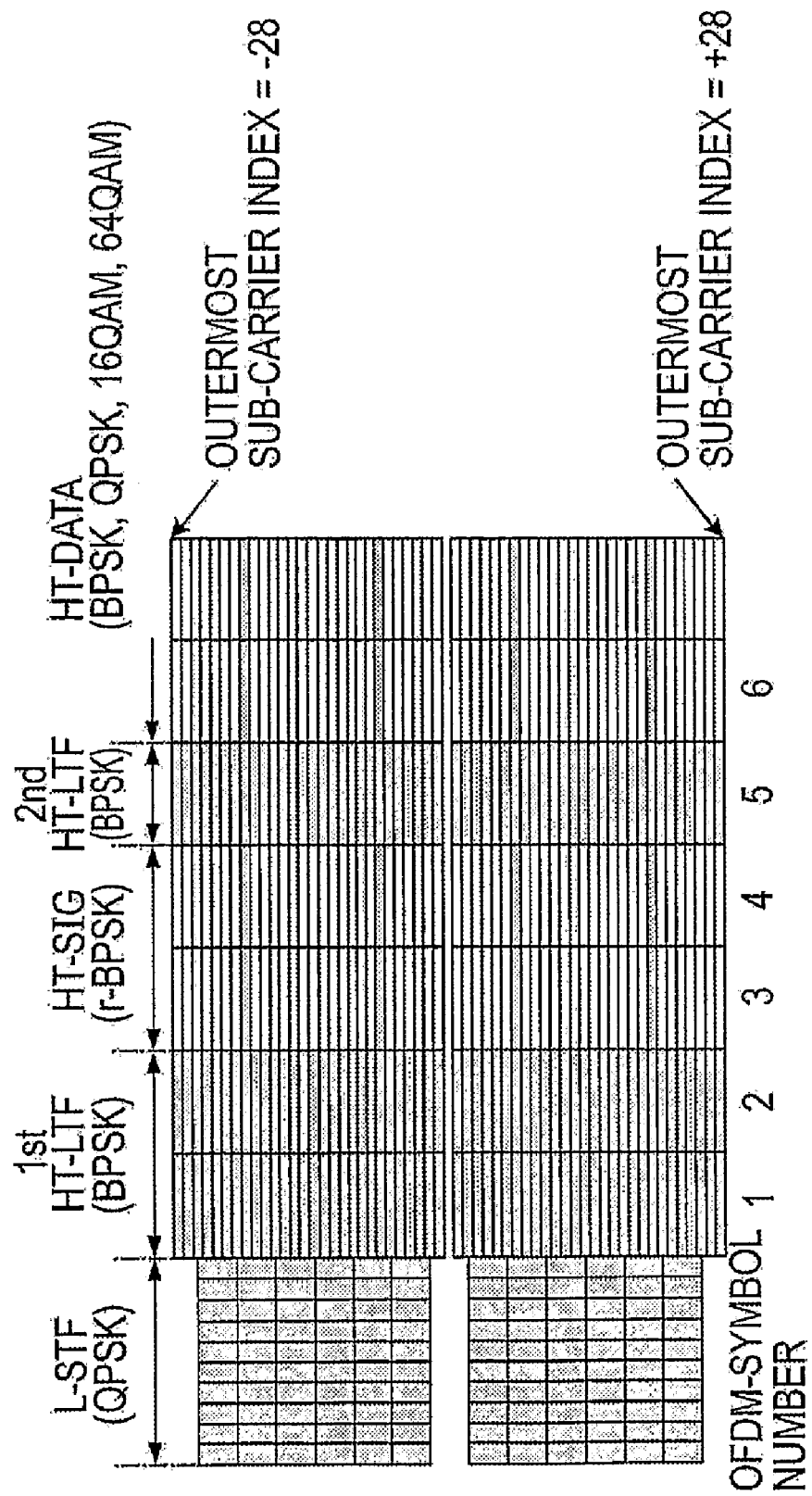
FIG. 4 shows the format of a Green-Field packet used in the case where IEEE802.11n is used.
Figure 12:
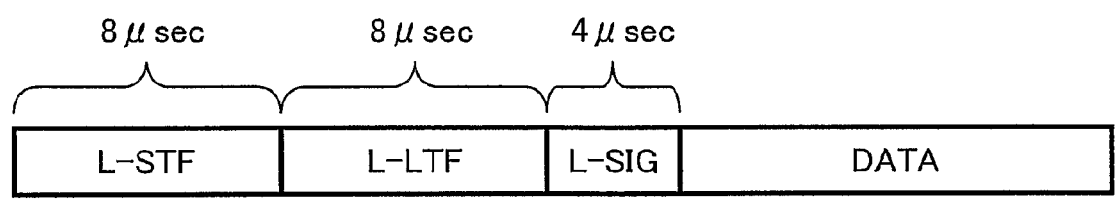
FIG. 12 shows a packet format used in legacy mode specified by IEEE802.11n.
Figure 13:
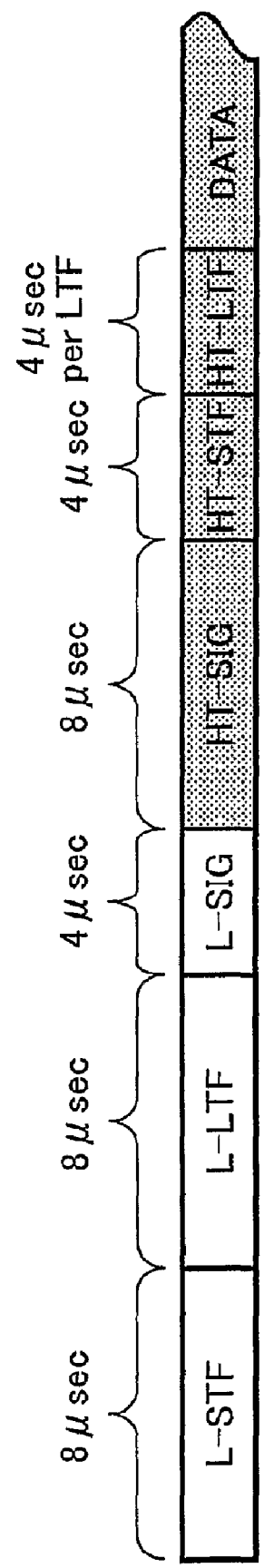
FIG. 13 shows a packet format used in Mixed Mode specified by IEEE802.11n.
Figure 14:
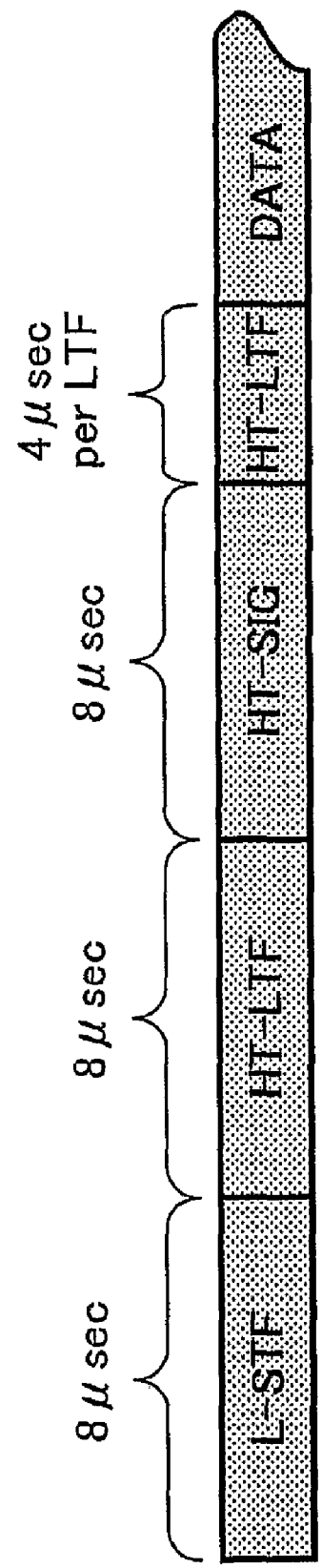
FIG. 14 shows a packet format used in Green Field specified by IEEE802.11n.

The outlines of the formats of the legacy packet, the MM packet, and the GF packet that are specified by IEEE802.11n had already been described with reference to FIGS. 12 to 14. FIGS. 2 to 4 also illustrate the above-described packet formats in consideration of the number of tones included in each of the fields.

Comparing FIG. 3 with FIG. 4, when the MM packet is received, the first to fifth OFDM symbols of the L-LTF, the L-SIG, and the HT-SIG include 52 tones. However, when the GF packet is received, the first to fifth OFDM symbols of the HT-LTF, the HT-SIG, and the 2nd HT-LTF include 56 tones. That is to say, when comparing the GF packet with the MM packet in terms of the frequency area, each of the first to fifth OFDM symbols of the GF packet is added with two subcarriers at both ends, when compared to the corresponding fields of the MM packet.

Therefore, a controller 30 determines whether or not a signal is included in an output transmitted from each of the FFTs 3 and 13, at ±27 and 28 shown in the subcarrier index. If the signal is included in each of the above-described subcarrier indexes, it can be estimated that the received packet is the GF packet. Otherwise, it can be estimated that the received packet is the MM packet.

As a method of determining whether or not a signal is included at the positions corresponding to ±27 and 28 shown in the subcarrier index, an absolute determination method of comparing the power values of subcarriers provided at both ends of the OFDM symbol to a predetermined threshold value, a relative-determination method of making determination by comparing power of the subcarrier with that of adjacent subcarriers (that is, several subcarriers existing in the −26-to +26 range shown in the subcarrier index), and so forth can be considered.

The above-described determination can be made not only by considering the first OFDM symbol, but by calculating the average of results of measuring the power of subcarriers at both ends of the first to third OFDM symbols in the same manner. Subsequently, the above-described determination can be made with precision without being affected by noise problems.

Further, it becomes possible to detect a small difference between the symbol power generated in the case where 52 tones (or 104 tones) are used and that generated in the case where 56 tones (or 114 tones) are used, and determine the format of the reception packet on the basis of the detection result.

Further, there is a difference between the legacy preamble and Cyclic Shift in the HT format of the MM packet and those of the GF packet. The above-described difference can be considered, as another difference between the format of the MM packet and that of the GF packet.

When the MIMO communications are performed, an intended beam is generated while signals that are the same as each other and/or similar to each other are transferred through different spatial streams. Therefore, for IEEE802.11n, a method of setting a time difference between the transmission time corresponding to one spatial stream and that corresponding to the other spatial stream is studied, where the time difference is set by the transmission device (refer to Non-Patent Document 1, for example). (Adding a time-difference signal to a spatial stream is referred to as "Cyclic Shift" and/or "Cyclic Delay Diversity (CDD)".

An appropriate time difference set between the above-descried transmission time and the other transmission time changes according to the number of spatial streams. Further, IEEE802.11n independently specifies the time-difference value according to the spatial-stream number for each of the legacy-format portion and the HT-format portion of the MM packet, even though the same number of spatial stream is used. A time-difference value achieved through the Cyclic Shift performed in the legacy-format portion is shown in Table 3 and that achieved through the Cyclic Shift performed in the HT-format portion is shown in Table 4, respectively. Comparing the above-described tables with each other, for example, even though each of the spatial-stream numbers is two, a time difference of −200 nanoseconds is given for the legacy-format portion and a time difference of −400 nanoseconds is given for the HT-format portion. That is to say, the time difference given for the HT-format portion is larger than that given for the HT-format portion.

TABLE 3

| $T_{CS}^{iTX}$ values for the legacy portion of the packet | | | | |
| --- | --- | --- | --- | --- |
| Number of Tx Chains | cyclic shift for Tx chain 1 | cyclic shift for Tx chain 2 | cyclic shift for Tx chain 3 | cyclic shift for Tx chain 4 |
| 1 | 0 ns | — | — | — |
| 2 | 0 ns | −200 ns | — | — |
| 3 | 0 ns | −100 ns | −200 ns | — |
| 4 | 0 ns | −50 ns | −100 ns | −150 ns |

TABLE 4

| $T_{CS}^{iSIS}$ values for HT portion of the packet | | | | |
| --- | --- | --- | --- | --- |
| Number of spatial streams | Cyclic shift for Spatial stream 1 | Cyclic shift for spatial stream 2 | Cyclic shift for spatial stream 3 | Cyclic shift for spatial stream 4 |
| 1 | 0 ns | — | — | — |
| 2 | 0 ns | −400 ns | — | — |
| 3 | 0 ns | −400 ns | −200 ns | — |
| 4 | 0 ns | −400 ns | −200 ns | −600 ns |

Figure 5:
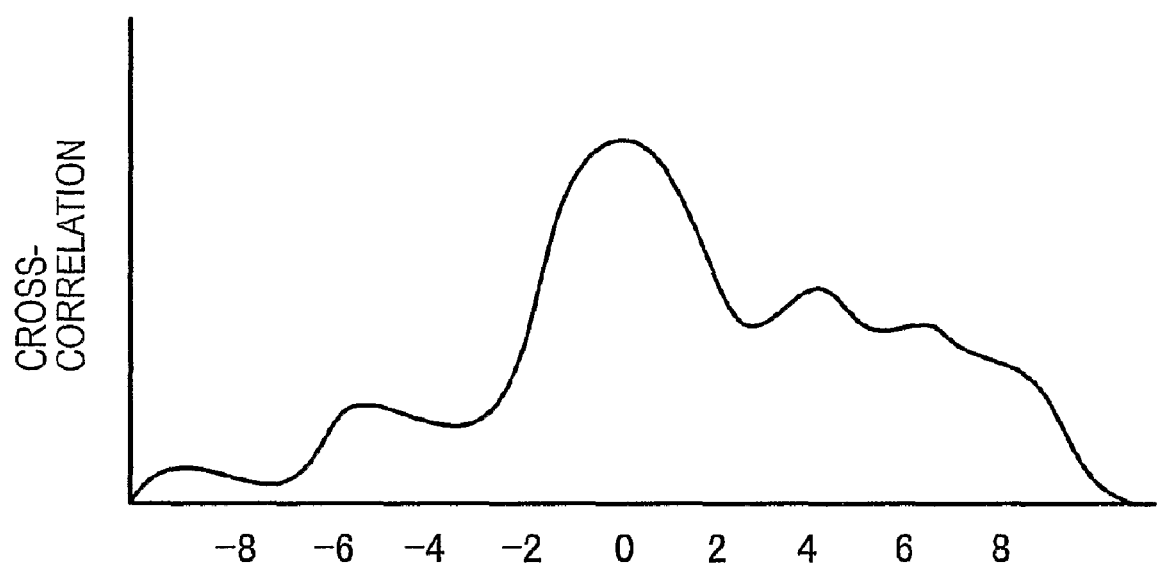
FIG. 5 shows the state where a correlation appears somewhere beyond the reference when a cross-correlation is calculated by using an L-LTF to which no time-difference signal obtained by Cyclic Shift is added.
Figure 6:
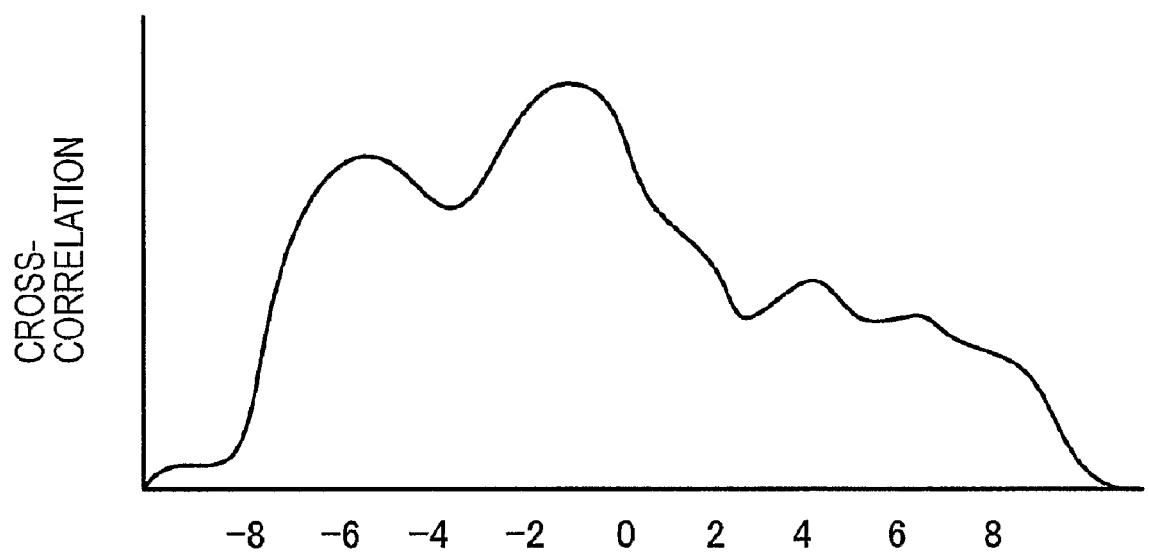
FIG. 6 shows the state where the correlation bulges forward of the reference when the cross-correlation is calculated by using the L-LTF to which the time-difference signal obtained by Cyclic Shift is added.

Usually, on the reception-device side, the cross-correlation between an L-LTF-reception signal and a known training symbol is calculated, with reference to the peak of an auto-correlation of an L-STF portion included in a transmitted legacy preamble. Then, synchronization is achieved on the basis of the position where the peak appears. When the time-difference signal is not added, the correlation appears somewhere beyond the reference (refer to FIG. 5). However, when a time-difference signal corresponding to the transmission time shifted forward is added, the correlation bulges forward of the reference (refer to FIG. 6). Further, as the time difference increases, the bulge-in-forward shown in the delay profile increases. Therefore, when the delay amount is large, the controller 30 can determine that the HT format is used.

Comparing the packet format shown in FIG. 3 with that shown in FIG. 4, the first OFDM symbol of the MM packet is the L-LTF, that is, the legacy format. However, the first OFDM symbol of the GF packet is the HT-LTF, that is, the HT format. Therefore, it becomes possible to determine the packet format on the basis of the size of the delay amount with reference to a delay profile generated by a timing-detection unit 21, so as to perform timing acquisition. When it is determined that the GF packet is used, the controller 30 stops performing data-decoding processing in subsequent fields so that the waste of power decreases.

Figure 7:
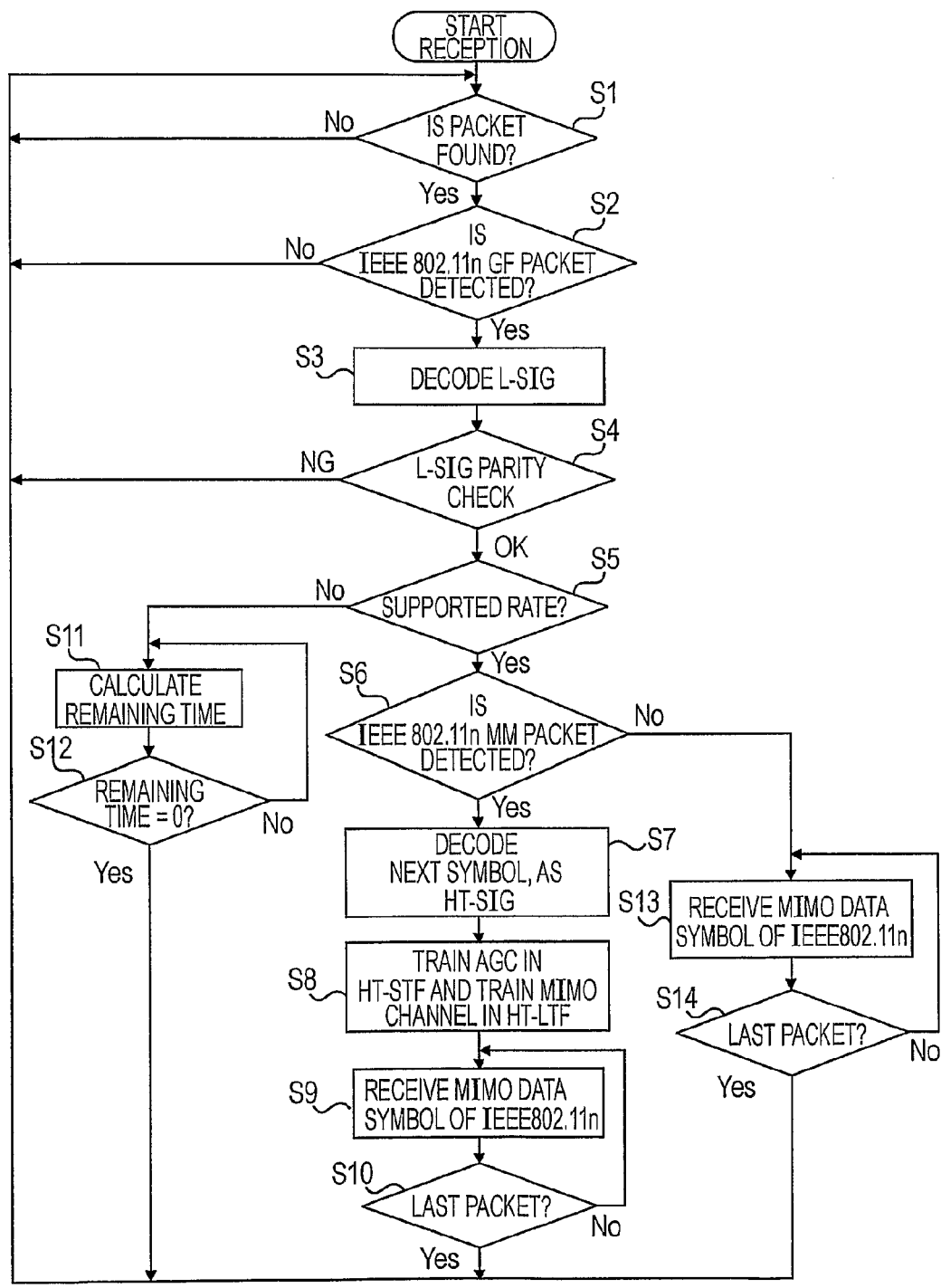
FIG. 7 is a flowchart showing the steps of communication operations performed by a radio-communication device when a packet format is determined before an L-SIG appears on the basis of the difference between an L-LTF field and an HT-LTF field.

Referring to the difference between the symbol-tone number of the L-LTF field and that of the HT-LTF field, and the difference between the transmission-time difference corresponding to one spatial stream and that corresponding to the other spatial stream that have been described above, it becomes possible to determine the packet format at the part starting backward from the third symbol of the reception packet (the part starting backward from the L-SIG when the MM packet is used). When it is determined that the GF packet is used, at that time, decoding processing can be stopped in all of the fields from the L-SIG on down, which is highly effective at saving power. FIG. 7 shows the steps of communication operations performed by the radio-communication device in that case in the form of a flowchart.

When the radio-communication device finds a packet by receiving the L-STF field while the radio-communication device waits for the data reception (step S1), the radio-communication device determines the format of the reception packet on the basis of the difference between the tone numbers of the OFDM symbols that are received subsequently, or the difference between the transmission-time difference corresponding to one spatial stream and that corresponding to the other spatial stream (step S2).

If it is determined that the GF packet is used (Yes at step S2), at that time, the decoding processing performed in subsequent fields is stopped, so as to reduce the consumption power.

If it is determined that the reception packet is not the GF packet, the L-SIG field following the L-LTF field is received and decoded (step S3), and parity check is performed (step S4). If a parity error occurs, at that time, the decoding processing performed in subsequent fields is stopped.

Subsequently, the radio-communication device reads the transfer rate written in a Rate field of the L-SIG, and checks if the read transfer rate is a rate supported by it (step S5).

If it is determined that the rate corresponding to the reception packet is not supported by the reception device (No at step S5), the remaining time until the transmission of the data portion of the packet is finished is calculated (step S11), and the radio-communication device stops operating and waits until the above-described time elapses (step S12).

Further, when the reception packet is transmitted at the supported rate (Yes at step S5), the fourth OFDM symbol is received and it is determined whether or not the reception packet is an MM packet supporting IEEE802.11n (step S6). If the reception packet is the MM packet, the HT-SIG field including the fourth and fifth OFDM symbols is subjected to BPSK modulation in phase space rotated by as much as 90 degrees with reference to the L-SIG field (described later). Therefore, it becomes possible to determine whether the reception packet is the legacy packet or the MM packet.

If it is determined that the reception packet is the legacy packet (No at step S6), the reception of data symbols following and starting from the L-SIG is performed in repetition (step S13) until the processing reaches the last of the packet (step S14).

Further, if it is determined that the reception packet is the MM packet (Yes at step S6), the OFDM symbol following the L-SIG is determined to be the HT-SIG and subjected to the decoding processing (step S7). Then, training of AGC (not shown in FIG. 1) is performed by using the HT-STF field and training of a channel matrix H is performed in the 2nd HT-LTF (step S8).

Then, the reception of the data symbols following and starting from the HT-LTF is performed in repetition (step S9) until the processing reaches the last of the packet (step S10). The data symbol includes the MIMO signal. The reception-weight matrix X calculated on the basis of the channel matrix H is multiplied by a reception signal. Subsequently, the data symbol can be separated into the original spatial-stream signals without any crosstalk.

Heretofore, the method of using the difference between the format of the MM packet and that of the GF packet has been described, the difference being generated in the field started backward from the L-SIG. Of course, the difference between the format of the MM packet and that of the GF packet can be used, the difference being generated in the field started forward from the L-SIG. For example, the difference between the symbol position where the HT-SIG appears in the preamble of the MM packet and that where the HT-SIG appears in the preamble of the GF packet can be used.

Figure 8:
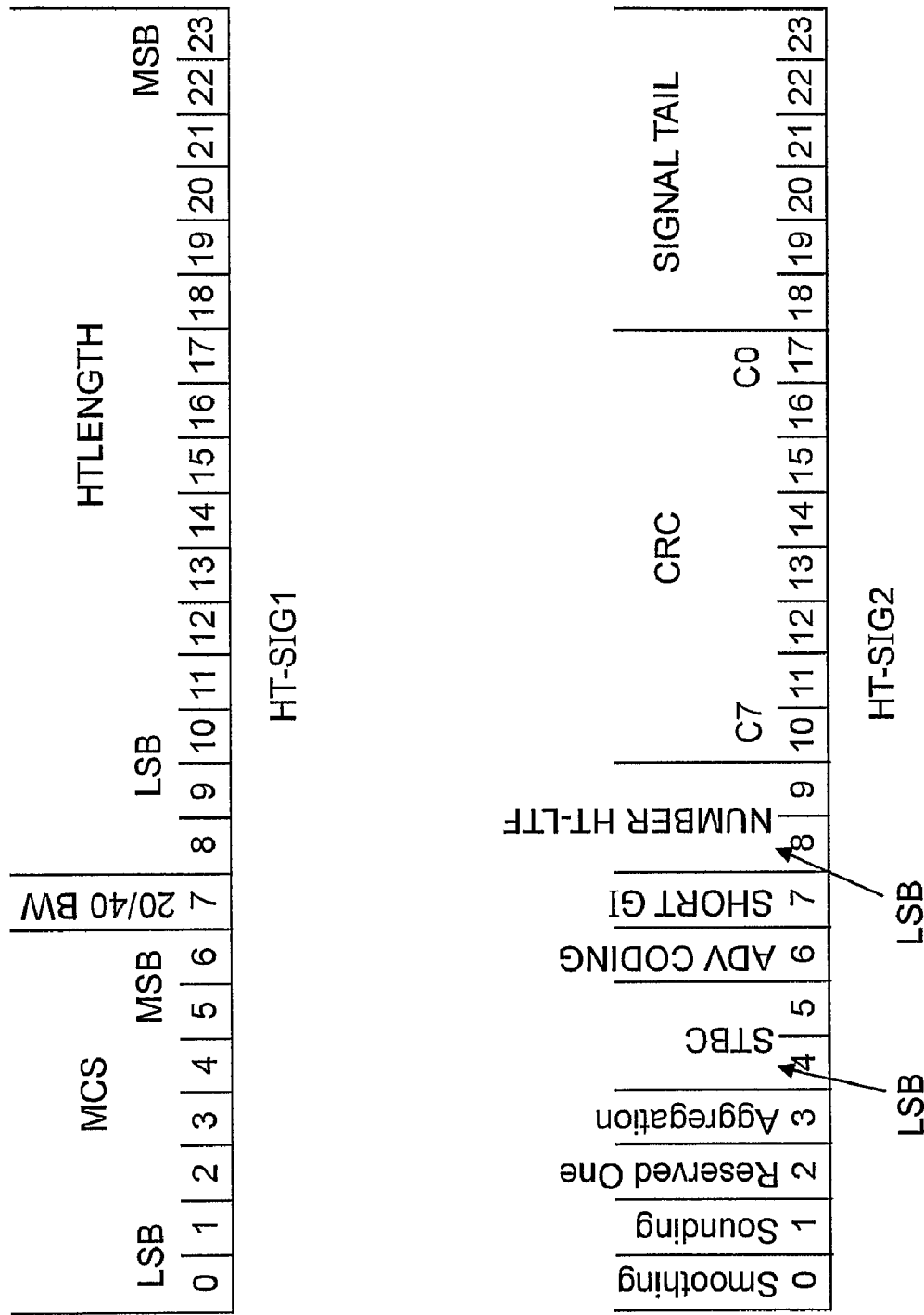
FIG. 8 shows the data configuration of an HT-SIG field.

FIG. 8 shows the data configuration of the HT-SIG field. As shown in the drawing, the HT-SIG includes two OFDM symbols, and information required, so as to interpret the HT format including the MCS used for the PHY payload (PSDU), the data length of the payload, and so forth, is written in the HT-SIG (refer to Non-Patent Document 1 (Appendix. A)).

Irrespective of whether the MM packet or the GF packet is used, the details of the information written in the HT-SIG field are one and the same. Further, irrespective of whether the MM packet or the GF packet is used, the preamble portion including the HT-SIG field is arranged so that the BPSK modulation with an encoding rate of ½ is used for both the legacy preamble and an HT preamble. The above-described low data rate is used, so as to perform processing and/or information notification necessary for performing the packet reception with stability.

Figure 9:
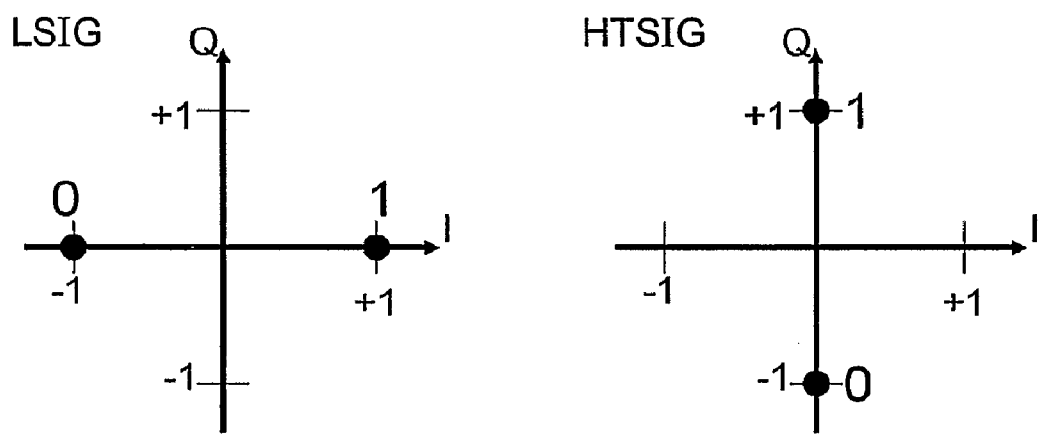
FIG. 9 shows a mechanism to perform BPSK modulation for the HT-SIG field in phase space rotated by as much as 90 degrees with reference to an L-SIG field.

Further, in the HT-SIG field, the BPSK modulation is performed in the phase space rotated by as much as 90 degrees with reference to the L-SIG field (or the previous field and/or the subsequent field) (refer to Non-Patent Document 1 and FIG. 9). The above-described rotation of the phase space is specified, so as to discriminate between the legacy packet and the MM packet. Since the legacy-packet-determination method itself does not relate to the substance of the present invention, the description thereof will not be provided.

The essence of the above-described embodiment is that the position of the OFDM symbol of the MM packet, the OFDM symbol being obtained by performing the phase rotation and the BPSK modulation, is different from that of the OFDM symbol of the GF packet, the OFDM symbol being obtained by performing the phase rotation and the BPSK modulation. When comparing FIG. 3 with FIG. 4 again, where the MM packet is used, the BPSK modulation with the phase rotation of 90 degrees is performed for the fourth to fifth OFDM symbols corresponding to the HT-SIG. However, where the GF packet is used, the BPSK modulation with the phase rotation of 90 degrees is performed for the third to fourth OFDM symbols corresponding to the HT-SIG. Therefore, the controller 30 can determine the format of a reception packet by using any of the following methods by referring to the result of decoding performed by the decoding unit 26.

(1) From the absolute phase space of the third OFDM symbol of the reception packet, the packet format is determined. If the phase space is rotated by as much as 90 degrees, the HT-SIG is used. If the third OFDM symbol is the HT-SIG, it can be determined that the GF packet is used. However, phase correction needs to be performed in advance, so as to determine the absolute phase space.

(2) From the absolute phase space of the fifth OFDM symbol of the reception packet, the packet format is determined. If the phase space is rotated by as much as 90 degrees, the HT-SIG is used. If the fifth OFDM symbol is the HT-SIG, it can be determined that the MM packet is used. However, the phase correction needs to be performed in advance, so as to determine the absolute phase space.

(3) The packet format is determined on the basis of the relative phase difference between the second and third OFDM symbols of the reception packet. If the MM packet is used, as shown in FIG. 3, the second symbol is the L-LTF field and the third symbol is the L-SIG field, which means that there is no phase-space difference. On the other hand, when the GF packet is used, the third field is the HT-SIG field even though the second field is the HT-LTF field. Therefore, the phase space thereof is rotated by as much as 90 degrees, as shown in FIG. 9, so that there is the relative phase difference between the above-described symbols. Therefore, when the relative phase difference is detected between the second and third OFDM symbols of the reception packet, it can be determined that the GF packet is used. Here, when detecting the relative phase difference, the phase-correction processing does not need to be performed in advance (ditto in the following description).

(4) The packet format is determined on the basis of the relative phase difference between the third and fourth OFDM symbols of the reception packet. If the MM packet is used, as shown in FIG. 3, the fourth symbol is the HT-SIG field even though the third field is the L-SIG field. Therefore, the phase space thereof is rotated by as much as 90 degrees, as shown in FIG. 9, so that there is a relative phase difference between the above-described symbols. On the other hand, when the GF packet is used, both the third and fourth symbols correspond to the HT-SIG field, which means that there is no phase-space difference. Therefore, when a relative phase difference is detected between the third and fourth OFDM symbols of the reception packet, it can be determined that the MM packet is used.

(5) The packet format is determined on the basis of the relative phase difference between the fourth and fifth OFDM symbols of the reception packet. If the MM packet is used, as shown in FIG. 3, both the third and fourth symbols correspond to the HT-SIG field, which means that there is no phase-space difference. On the other hand, when the GF packet is used, the fourth field is the HT-SIG field, but the fifth field is the HT-LTF field. Therefore, the phase space thereof is rotated by as much as 90 degrees, as shown in FIG. 9, so that there is a relative phase difference between the above-described symbols. Therefore, when the relative phase difference between the fourth and fifth OFDM symbols of the reception packet is detected, it can be determined that the GF packet is used.

Further, the presence or absence of a parity bit can be noted, as another difference between the format of the MM packet and that of the GF packet in the fields from the L-SIG on down.

When the MM packet is used, the L-SIG field received, as the third OFDM symbol, is provided with a parity bit, and the transfer rate and/or the data length. FIG. 15 shows the data configuration of the L-SIG field. According to the above-described drawing, the parity-check mechanism is provided for the seventeenth bit in the decreasing order and even parity for zero to sixteen bits is performed.

On the contrary, when the GF packet is used, the third OFDM symbol corresponds to the first-half H-SIG field (H-SIG1) and the position of the seventeenth bit thereof corresponds to part of a data-length field of a PSDU (PHY Service Data Unit) and does not correspond to the parity bit.

Therefore, the controller 30 refers to a result of decoding the third OFDM symbol, the decoding being performed by the decoding unit 26, and performs parity check on the premise that the L-SIG is used. When an error occurs, the controller 30 can estimate that the MM packet is not used, but the GF packet is used.

However, since the parity is only one bit, no parity error may occur by accident even though the GF packet is used. As an alternate plan for that, a method of performing error detection by using a CRC (Cyclic Redundancy Code) included in the HT-SIG field can be provided. Otherwise, a method of performing parity check for the L-SIG included in the MM packet and performing CRC check for the HT-SIG in combination can be considered.

Figure 10:
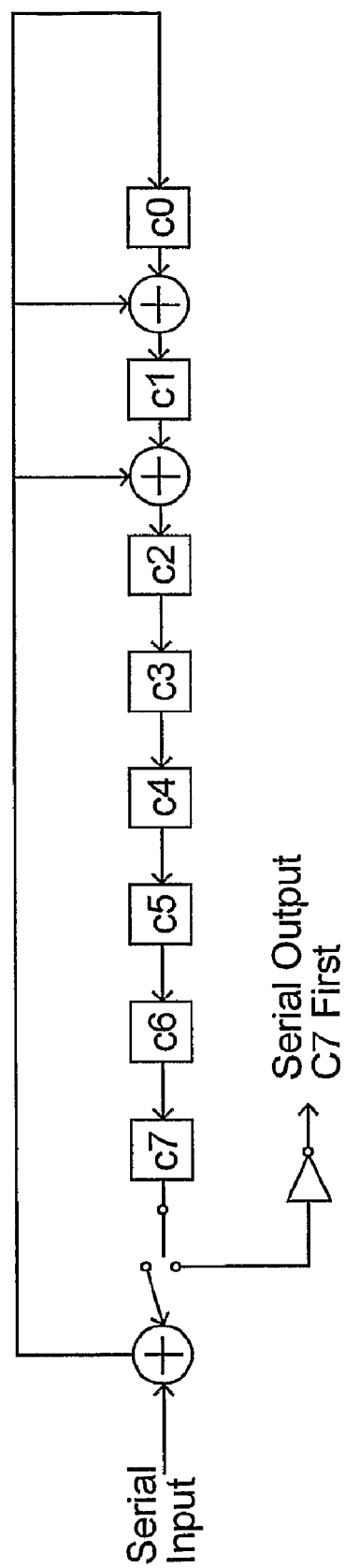
FIG. 10 shows a method of calculating CRC in an HT-SIG.

As shown in FIG. 8, the HT-SIG includes the first-half HT-SIG1 and the latter-half HT-SIG2. The 0 to 23 bits of the HT-SIG1 and the 0 to 9 bits of the HT-SIG2 are subjected to CRC protection by using a CRC field of 7 bits including the tenth to seventeenth bits of the HT-SIG2. For reference, a calculation method provided, so as to detect a CRC error occurring in the HT-SIG, is shown in the following expression and FIG. 10.

[Expression 5]

$$crc(D) = M(D)D^8 \text{ modulo } G(D) \qquad (5)$$

When the MM packet is used, the fourth to fifth OFDM symbols of the reception packet correspond to the HT-SIG field, as shown in FIG. 3. Therefore, the controller 30 can determine the format of the reception packet by referring to the result of decoding the corresponding field, the decoding being performed by the decoding unit 26, and detecting an error caused by the CRC.

If the radio-communication device is a Mixed-Mode terminal which does not support Green Field, the packet-format determination performed for every packet format on the basis of the position where the HT-SIG appears is achieved only by using the result of CRC-error detection performed in the field corresponding to the CRC of the HT-SIG included in the MM packet. On the other hand, if the radio-communication device is a terminal supporting Green Field, the packet-format determination can be made on the basis of a result of the CRC-error detection performed in the CRC field of the HT-SIG included in the GF packet.

Figure 11:
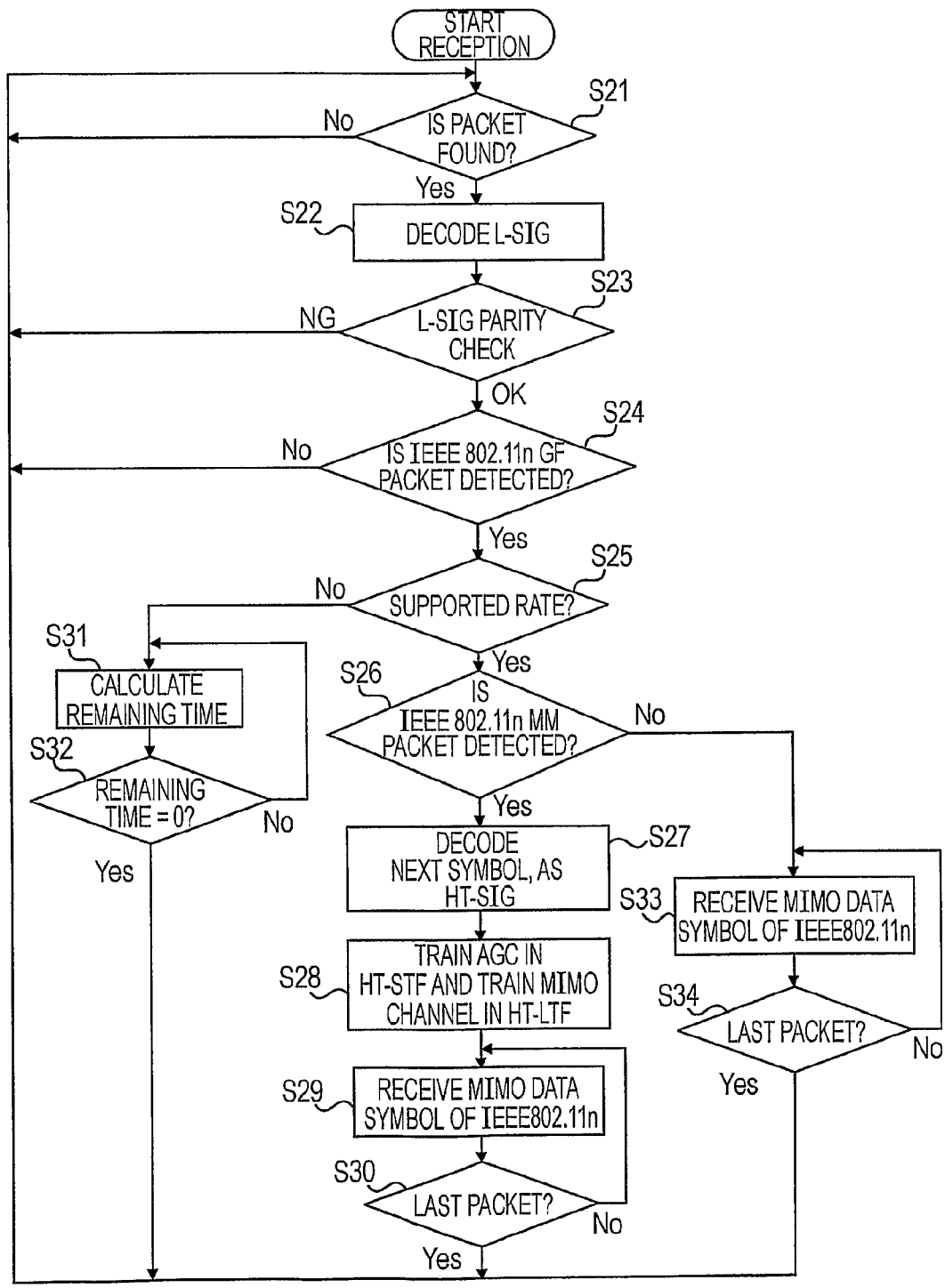
FIG. 11 is a flowchart showing the steps of communication operations performed in fields from the L-SIG on down by the radio-communication device on the basis of the difference between the positions where the HT-SIGs appear.

FIG. 11 shows the steps of communication operations performed by the radio-communication device in the form of a flowchart, where the packet-format determination is made in fields from the L-SIG on down on the basis of the difference between the positions where the HT-SIGs appear. In that case, the radio-communication device performs reception processing based on the premise that the reception packet is generated in the MM-packet format.

When the radio-communication device finds a packet by receiving the L-STF field while the radio-communication device waits for the data reception (step S21), the radio-communication device tries to receive and decode the subsequent L-SIG field (step S22).

Then, the parity check is performed on the basis of the position of the seventeenth bit of the third OFDM symbol corresponding to the L-SIG field (step S23).

Here, if a parity error occurs (No at step S23), it is estimated that the reception packet is not the MM packet, but the GF packet. In that case, decoding processing performed in subsequent fields is stopped, so as to reduce the power consumption.

On the other hand, if no parity error occurs (Yes at step S23), checking is performed for at least one of (1) the absolute phase space of the third OFDM symbol, (2) the absolute phase space of the fifth OFDM symbol of the reception packet, (3) the relative phase difference between the second and third OFDM symbols of the reception packet, (4) the relative phase difference between the third and fourth OFDM symbols of the reception packet, and (5) the relative phase difference between the fourth and fifth OFDM symbols of the reception packet, so as to check whether or not the reception packet is the GF packet (step S24). Here, if it is estimated that the reception packet is not the MM packet, but the GF packet, decoding processing performed in subsequent fields is stopped, so as to reduce the power consumption.

On the other hand, the radio-communication device estimates that the reception packet is the MM packet and/or the legacy packet. Then, the radio-communication device reads the transfer rate written in a Rate field of the L-SIG and checks whether or not the transfer rate is a rate supported by it (step S25).

Here, if the radio-communication device determines that the reception packet is transferred at a rate that is not supported by the reception device (No at step S25), the radio-communication device calculates the remaining time until after the transmission of data portion of the packet is finished (step S31), and stops performing operations and waits until the above-described time elapses (step S32).

Further, when the reception packet is transmitted at the supported rate (Yes at step S25), the radio-communication device receives the fourth OFDM symbol and determines whether or not the reception packet is the MM packet supporting IEEE802.11n (step S26). If the reception packet is the MM packet, the BPSK modulation is performed in phase space rotated by as much as 90 degrees with reference to the L-SIG field for the HT-SIG field including the fourth and fifth OFDM symbols (as described above). Therefore, it becomes possible to determine whether the reception packet is the legacy packet or the MM packet.

If it is determined that the reception packet is the legacy packet (No at step S26), the reception of data symbols following and starting from the L-SIG is performed in repetition (step S33) until the processing reaches the last of the packet (step S34).

Further, if it is determined that the reception packet is the MM packet (Yes at step S26), the OFDM symbol following the L-SIG is determined to be the HT-SIG and subjected to decoding processing (step S27). Then, training of AGC (not shown in FIG. 1) is performed by using the HT-STF field and training of the channel matrix H is performed in the 2nd HT-LTF (step S28).

Then, the reception of the data symbols following and starting from the HT-LTF is performed in repetition (step S29) until the processing reaches the last of the packet (step S30). The data symbol includes the MIMO signal. The reception-weight matrix W calculated on the basis of the channel matrix H is multiplied by a reception signal. Subsequently, the data symbol can be separated into the original spatial-stream signals without causing any crosstalk.

INDUSTRIAL APPLICABILITY

Thus, the present invention has been described in detail with reference to specified embodiments. However, it is obvious that any person skilled in the art can modify and/or substitute the embodiments within the spirit and scope of the present invention.

In this specification, the present invention has been described with an emphasis on the embodiments wherein the present invention is used for the communication system supporting IEEE802.11n. However, the essence of the present invention is not limited to the above-described description. The present invention can also be used for a different communication system configured on the basis of specifications specifying a plurality of packet formats.

Further, in this specification, the present invention has been described with an emphasis on the embodiments wherein the present invention is used for the Mixed-Mode terminal that does not support Green Field. However, the present invention can be used, as a method used by a Green-Field terminal, so as to determine whether a reception packet is the MM packet or the GF packet, as a matter of course.

In short, the present invention has been disclosed in the form of an exemplification, and the details on the specification should not be interpreted restrictively. The scope of claims should be considered, so as to determine the essence of the present invention.

The invention claimed is:

1. A radio-communication device for performing a packet-reception processing in a communication environment in which an OFDM (Orthogonal Frequency Division Multiplexing) modulation method is used and where packets generated in different formats traffic, a number of tones of a subcarrier included in a single OFDM symbol differing for each of the different formats in at least a packet field, the radio-communication device comprising:
a signal-reception unit configured to receive a MIMO (Multi Input Multi Output) signal including a plurality of multiplexed spatial streams from a packet-transmission source via an antenna, a predetermined time difference being set between the spatial streams;
a data-decoding unit configured to decode the MIMO signal received by the signal-reception unit, when the predetermined time difference is less than a predetermined difference value;
a data-processing unit configured to process data decoded by the data-decoding unit;
a format-determination unit configured to determine, based on a relative phase difference between a previous packet field and a subsequent packet field adjacent to the previous packet field, a packet format of the MIMO signal received by the signal-reception unit; and
a control unit configured to stop an operation of the data-decoding unit when the data-processing unit does not support the packet format, which is determined by the format-determination unit, the operation being performed in a field that comes after a field at which the format-determination unit determines the packet format.

2. The radio-communication device according to claim 1, wherein the format-determination unit is further configured to determine the packet format based on whether the subcarrier is provided at an end part that had been subjected to an FFT processing performed by a signal-processing unit.

3. The radio-communication device according to claim 2, wherein the format-determination unit is further configured to determine the packet format based on a signal-power value of an end part of the packet field.

4. The radio-communication device according to claim 2, wherein the format-determination unit is further configured to determine the packet format based on an average value of signal-power values of end parts of a plurality of packet fields.

5. The radio-communication device according to claim 2, wherein the format-determination unit is further configured to determine the packet format based on a relative value between a signal power of an end part of the packet field wherein the tone number of the subcarrier included in the single OFDM symbol changes for every format and a signal power obtained at a position adjacent thereto.

6. The radio-communication device according to claim 2, wherein the format-determination unit is further configured to determine the packet format based on a symbol power obtained in the packet field.

7. The radio-communication device according to claim 1, wherein the packet-transmission source transmitted the MIMO signal, the predetermined time difference having been set for a transmission time between the spatial streams, the time difference set for the transmission time in at least a packet field changes for every packet format, and the format-determination unit is further configured to calculate a delay profile of the MIMO signal and to determine the packet format based on a size of a delay amount.

8. The radio-communication device according to claim 1, wherein a phase-modulation processing is performed for a packet field by rotating a phase space by as much as a predetermined angle with reference to the previous packet field and the subsequent packet field, a field subjected to the phase-modulation processing achieved by rotating the phase space changes according to the packet format, and the format-determination unit is further configured to determine the packet format by locating the field subjected to the phase-modulation processing achieved by rotating the phase space.

9. A radio-communication device for performing a packet-reception processing in a communication environment in which an OFDM (Orthogonal Frequency Division Multiplexing) modulation method is used and where packets generated in different formats traffic, a number of tones of a subcarrier included in a single OFDM symbol differing for each of the different formats in at least a packet field, the radio-communication device comprising:

a signal-reception unit configured to receive a MIMO (Multi Input Multi Output) signal including a plurality of multiplexed spatial streams from a packet-transmission source via an antenna, a predetermined time difference being set between the spatial streams;

a data-decoding unit configured to decode the MIMO signal received by the signal-reception unit, when the predetermined time difference is less than a predetermined difference value;

a data-processing unit configured to process data decoded by the data-decoding unit;

a format-determination unit configured to determine a packet format of the MIMO signal received by the signal-reception unit, wherein a parity-check mechanism is provided in a field in the packet format supported by the data-processing unit, and the format-determination unit is further configured to determine the packet format according to a result of a parity check; and a control unit configured to stop an operation of the data-decoding unit when the data-processing unit does not support the packet format, which is determined by the format-determination unit based on the number of tones of the subcarrier, the operation being performed in a field that comes after a field at which the format-determination unit determines the packet format.

10. A radio-communication device for performing a packet-reception processing in a communication environment in which an OFDM (Orthogonal Frequency Division Multiplexing) modulation method is used and where packets generated in different formats traffic, a number of tones of a subcarrier included in a single OFDM symbol differing for each of the different formats in at least a packet field, the radio-communication device comprising:

a signal-reception unit configured to receive a MIMO (Multi Input Multi Output) signal including a plurality of multiplexed spatial streams from a packet-transmission source via an antenna, a predetermined time difference being set between the spatial streams;

a data-decoding unit configured to decode the MIMO signal received by the signal-reception unit, when the predetermined time difference is less than a predetermined difference value;

a data-processing unit configured to process data decoded by the data-decoding unit;

a format-determination unit configured to determine a packet format of the MIMO signal received by the signal-reception unit, wherein a CRC is provided in a packet field, the packet field where the CRC is provided changes according to the packet format, and the format-determination unit is further configured to determine the packet format based on a result of an error detection by using the CRC in either a field where the CRC is provided in a packet format supported by the data-processing unit or a field where the CRC is provided in a packet format that is not supported by the data-processing unit; and a control unit configured to stop an operation of the data-decoding unit when the data-processing unit does not support the packet format, which is determined by the format-determination unit based on the number of tones of the subcarrier, the operation being performed in a field that comes after a field at which the format-determination unit determines the packet format.

11. A radio-communication method for performing a packet-reception processing with a radio-communication device in a communication environment in which an OFDM (Orthogonal Frequency Division Multiplexing) modulation method is used and where packets generated in different formats traffic, a number of tones of a subcarrier included in a single OFDM symbol differing for each of the different formats in at least a packet field, the radio-communication method comprising:

receiving a MIMO (Multi Input Multi Output) signal including a plurality of multiplexed spatial streams from a packet-transmission source via an antenna, a predetermined time difference being set between the spatial streams;

decoding the MIMO signal received at the receiving, when the predetermined time difference is less than a predetermined difference value;

processing data decoded at the decoding;

determining, based on a relative phase difference between a previous packet field and a subsequent packet field adjacent to the previous packet field, a packet format of the MIMO signal received at the receiving; and stopping, with the radio-communication device, the decoding when the processing does not support the packet format determined at the determining, the stopped decoding being executed in a field that comes after a field for which the determining occurs.

12. A radio-communication device for performing a packet-reception processing in a communication environment in which an OFDM (Orthogonal Frequency Division Multiplexing) modulation method is used and where packets generated in different formats traffic, a number of tones of a subcarrier included in a single OFDM symbol differing for each of the different formats in at least a packet field, the radio-communication device comprising:

means for receiving a MIMO (Multi Input Multi Output) signal including a plurality of multiplexed spatial streams from a packet-transmission source via an antenna, a predetermined time difference being set between the spatial streams;

means for decoding the MIMO signal received by the means for receiving, when the predetermined time difference is less than a predetermined difference value;

means for processing data decoded by the means for decoding;

means for determining, based on a relative phase difference between a previous packet field and a subsequent packet field adjacent to the previous packet field, a packet format of the MIMO signal received by the means for receiving; and means for stopping an operation of the means for decoding when the means for processing does not support the packet format, which is determined by the means for determining, the operation being performed in a field that comes after a field at which the means for determining determines the packet format.

* * * * *